Dec. 2, 1958  H. G. MERHAUT  2,862,421
SPAR MILLING MACHINE

Filed July 11, 1956  5 Sheets-Sheet 2

INVENTOR.
HARRY G. MERHAUT
BY
*H. K. Parsons + L. W. Wright.*

ATTORNEYS.

Dec. 2, 1958 H. G. MERHAUT 2,862,421
SPAR MILLING MACHINE
Filed July 11, 1956 5 Sheets-Sheet 3

INVENTOR.
HARRY G. MERHAUT
BY
H. K. Parsons + L. W. Wright
ATTORNEYS.

Dec. 2, 1958   H. G. MERHAUT   2,862,421
SPAR MILLING MACHINE

Filed July 11, 1956   5 Sheets-Sheet 4

INVENTOR.
HARRY G. MERHAUT
BY
H. K. Parsons & L. W. Wright
ATTORNEYS.

Dec. 2, 1958 H. G. MERHAUT 2,862,421
SPAR MILLING MACHINE
Filed July 11, 1956 5 Sheets-Sheet 5

INVENTOR.
HARRY G. MERHAUT
BY
H. K. Parsons & L. W. Wright
ATTORNEYS.

United States Patent Office 2,862,421
Patented Dec. 2, 1958

2,862,421

SPAR MILLING MACHINE

Harry G. Merhaut, Cincinnati, Ohio, assignor to Cincinnati Milling Machine Co., Cincinnati, Ohio, a corporation of Ohio Application July 11, 1956, Serial No. 597,221

8 Claims. (Cl. 90—13)

This invention relates to improvements in milling machines and has particular reference to a novel and improved automatic control mechanism for such machines, particularly adaptable for utilization in connection with very large machines such as are presently employed in the production of airplane wings, spars and other large work.

Machines of this type frequently have a major feed stroke or longitudinal travel of 30 to 40 feet, rendering difficult the employment of hitherto utilized conventional type automatic contour control mechanisms.

One of the principal objects of the present invention therefor is the provision of a simplified automatic control mechanism which will make possible the elimination of lengthy control cables, flexible tubing and the like and which will permit elimination of lengthy control patterns or templates and the bulky and complicated support structures hitherto required in connection with such templates.

A further object of the invention is the provision of a compact simplified template control structure which will occupy minimum space and which may be readily built up from interchangeable units capable of individual initial formation and ready replacement and which will not only increase the accuracy and simplicity of construction of the machines but will make possible ready storage of a complete template structure in condition for practically instantaneous application to a machine when the particular operation dictated by the contour of the template unit is to be performed.

An additional object of the invention is the provision of an improved control structure which will facilitate and insure greater accuracy in production of long work pieces throughout the entire working stroke of the machine.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings the numeral 25 (Fig. 1) indicates the bed or base of a milling machine having ways such as 26 guiding the movement of the carrier slide 27 for the gantry frame 28. It will be appreciated that large machines of this sort frequently employ a multiple number of cutters for simultaneous or sequential operation on the work piece in order that the overall production time may be limited to a maximum extent. In the present instance, the gantry has been indicated as provided with ways 29 supporting cross slide 30 on which is mounted the vertically movable spindle carrier 31 for spindle 32 on which is mounted the cutter 33. Additionally, and on its opposite side the gantry is provided with arcuate ways 34 about which is adjustable the general frame unit 35. Unit 35 supports the guideways 36 mounting slide 37 for vertical movement as effectible by the piston and cylinder or hydraulic motor structure 38. Vertically movable with and transversely adjustable relative to the slide 37 is cross slide 39 having mounted therein for adjustment therewith, the horizontal spindle 40 supporting cutter 41.

Figure 2:
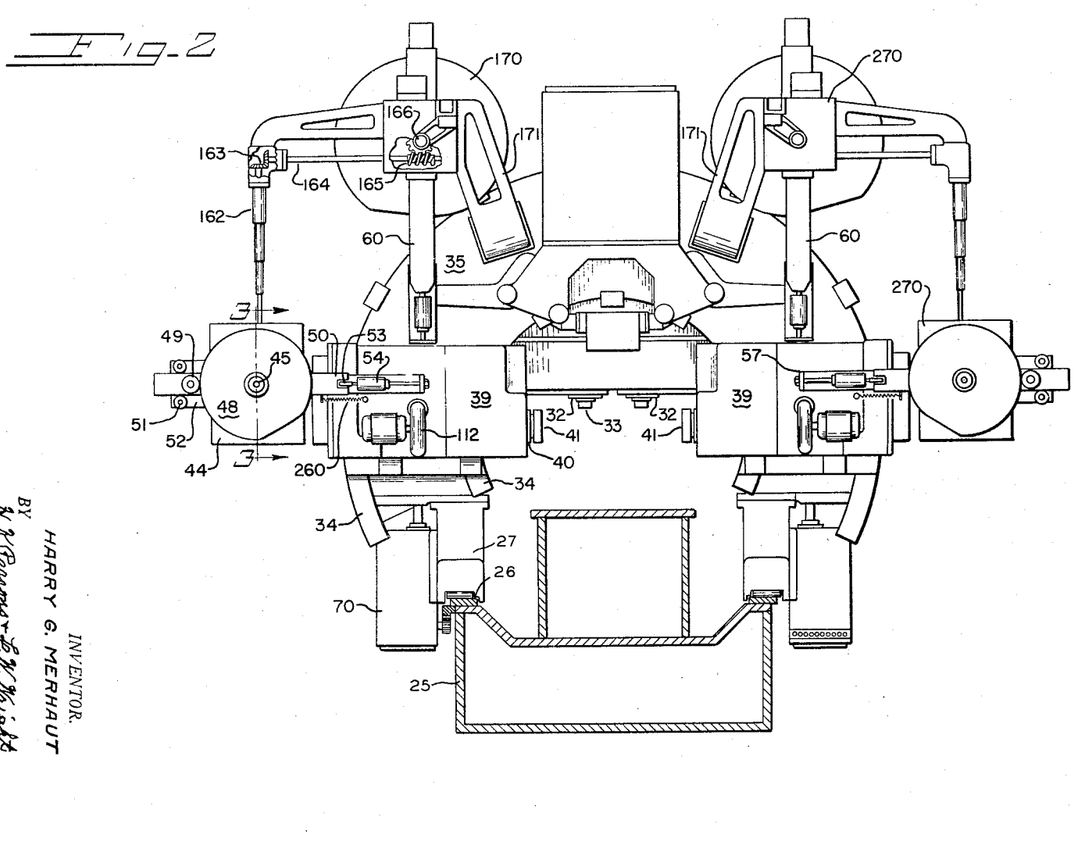
Figure 2 is an end elevation, the bed being shown in section as on the line 2—2 of Figure 1.
Figures 3, 4, 5:
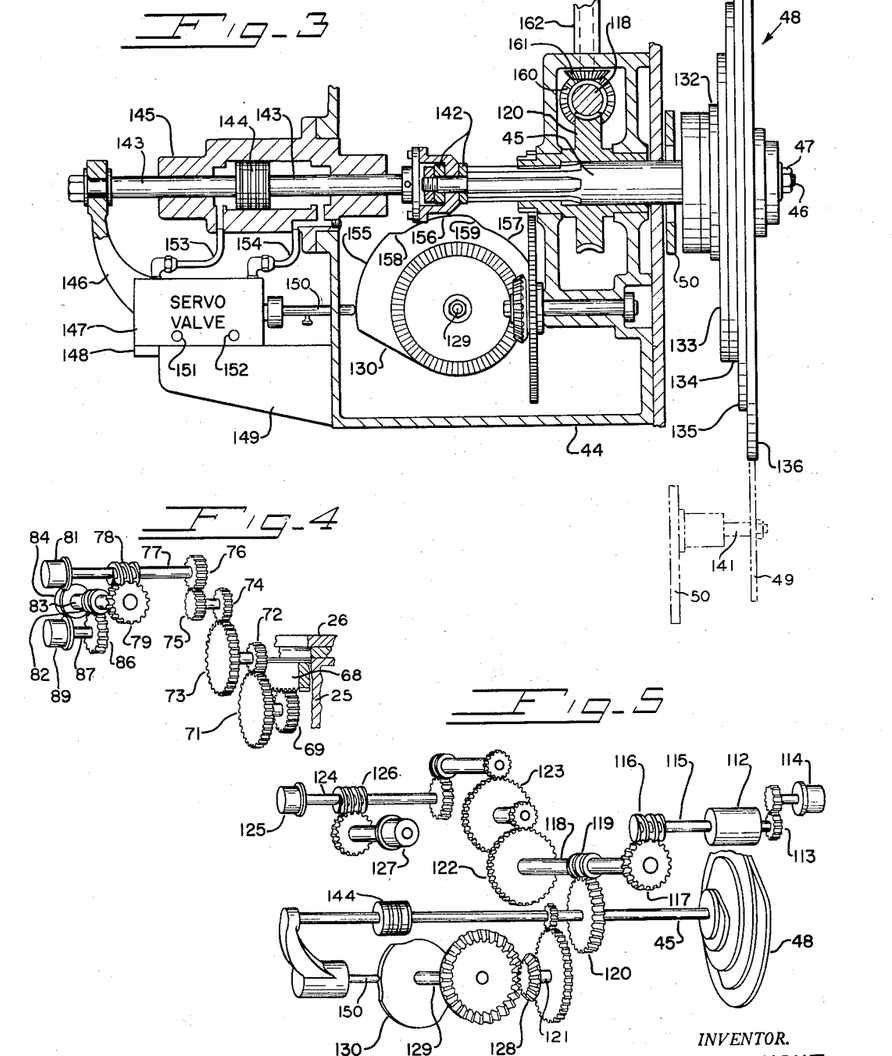
Figure 3 is a sectional view of a portion of the template control mechanism taken on the line 3—3 of Figure 2.
Figure 4 is a perspective view illustrating the master synchro drive mechanism.
Figure 5 is a similar view of one of the slave units and associate template controls.

Mounted on the vertical slide 37 is the housing 44 (Fig. 2) rotatably and translatably mounting the shaft 45 having a portion projecting from the housing or casing, as indicated at 46 (Fig. 3). Non-rotatably secured to the projecting end of the shaft as by nut 47 is the template cam nest indicated as an entirety by the reference character 48. This template cam is peripherally formed for engagement with the follower roll 49 on slide 50 (see also Fig. 2). The tracer slide bar 50 is supported for free movement by rollers or antifriction bearings such as 51 on guide bar or bracket 52 secured to or forming a part of the casing 44.

Figure 1:
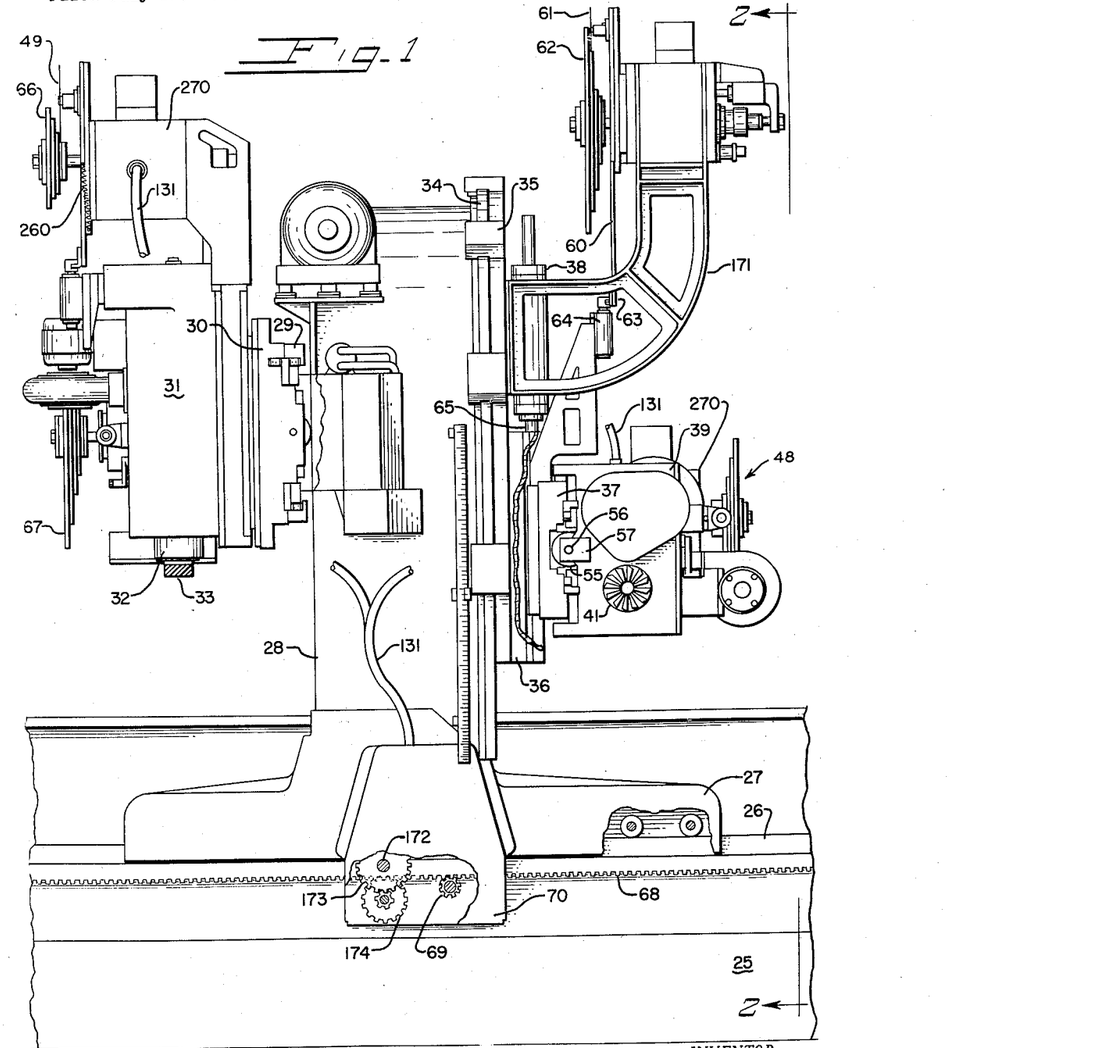
Figure 1 is a fragmentary side elevation of a machine embodying the improvements of the present invention with a right side cutter slide mechanism and controls shown in elevation.

Secured to the inner end of bar 50, as indicated in Figure 2, is the stem 53 of a conventional tracer servo-valve mechanism disposed within the tracer valve casing 54 mounted on the cross slide 39. The tracer valve casing 54 is connected in conventional manner to the hydraulic cylinder 55 (Fig. 1) carried by the vertical slide 37 and containing a piston whose rod 56 is secured to lug 57 on the cross slide 39. By this construction movements of the tracer bar 50 shifting the stem 53 of the servo control valve 54 will determine the pressures in the opposite ends of the cylinder 55 and thus in and out movement of cross slide 39 and cutter 41.

A similar mechanism including the tracer slide bar 60 (Fig. 1) with follower roller 61 cooperating with the cam nest or unit 62 determines the positioning of the valve stem 63 of servo valve 64 conventionally connected for control of operation of cylinder 38 carried by the frame 35 and having its piston rod 65 connected to the vertical slide 36 for effecting tracer controlled vertical movement of the unit as an entirety.

Additional cam nest controls 66 and 67, tracer bar 260 and follower roll 49 for control of other elements of the machine have been indicated at the left of Figure 1. Since the operation of these various units and their basic control are substantially identical in the various locations employed, it is believed detail description of one will suffice for a complete understanding of the operation and utilization of them all.

The particular machine here illustrated, as commercially utilized, has a stroke capacity for lengthwise travel of the cutter with respect to the work piece of 30 feet and in the unit shown in Figure 2 a 12" horizontal movement and 18" vertical movement of the spindle carrier 39 during such stroke, and corresponding vertical and horizontal range of movement for the other cutter units indicated and such additional units of similar nature as may form a part of the complete machine structure.

For simple and exceedingly accurate control of the various unit mechanisms, use is here made of a master synchro mechanism and drive as particularly illustrated in Figure 4, and a suitable number of individual synchro slave units of the type shown in Figures 3 and 5, for example, for individual control of the various movable spindle carrier units or other elements of the machine.

As indicated in Figures 1 and 4, the bed 25 of the machine is provided with a longitudinally extending rack 68 with which meshes the pinion 69 rotably supported by the master synchro casing 70 secured to and supported by the carriage 27 for the gantry 28. Contained within the casing 70 is the speedup gear 71 driving pinion 72 and in sequence the speed-up gear 73 and the drive pinions 74, 75, 76. Gear pinion 76 is secured on shaft 77 having a worm 78 effecting rotation of worm gear 79. Terminally, shaft 77 carries rotor 92 of the primary synchro 81 whose field is non-rotatably supported by casing 70. Worm wheel 79 drives worm 82 on shaft 83. This shaft operates rotor 93 of a second synchro unit 84 likewise having its field non-rotatably supported by the casing 70. Worm 82 drives worm gear 86 and shaft 87 having secured to its end for rotary movement therewith the rotor 94 of the third master sychro 89, likewise having its field non-rotatably supported by the master synchro casing 70.

By a structure, such as shown and described, a suitable ratio may be provided between the rates of actuation of the several master synchros, for example, the secondary synchro 84 may be operated at 1/50 the rate of the primary synchro 80 and the third synchro 89, in turn, at 1/50 of the rate of gear effected rotation of the primary 80 or a relative ratio of one to 2500 whereby an extremely accurate ultimate movement control is effected.

Figure 7:
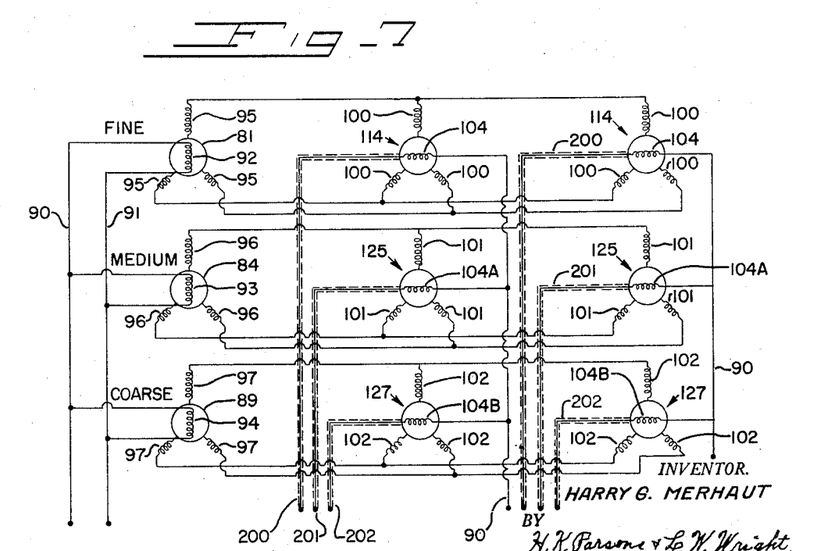
Figure 7 is a basic diagram of a two-slave unit synchro control circuit.

The individual synchros are of suitable conventional construction, the basic electrical coupling being as diagrammatically indicated in Figure 7. The A. C. current leads 90 and 91 are coupled to excite the master rotors 92, 93, and 94 of the synchro generators or transmitters 81, 84 and 89, which react on the idividual three phase stationary stator windings such as 95, 96 and 97 to transmit angular position information to the three-phase stator windings 100, 101, and 102 of the slave synchros whose rotor coils 104, 104A and 104B each have one terminus connected to lead 90, their other termini being connected by leads or wires 200, 201 and 202 with a phase detector such as 105.

Figure 8:
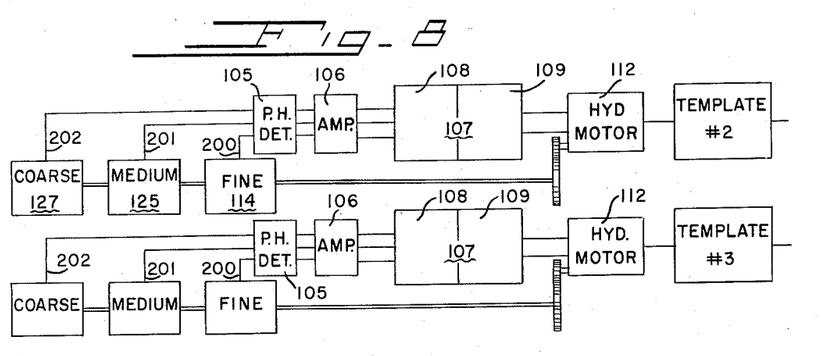
Figure 8 is a basic control diagram indicating the relationship and serial effectiveness of the components of the present automatic control system.
Figures 9, 10:
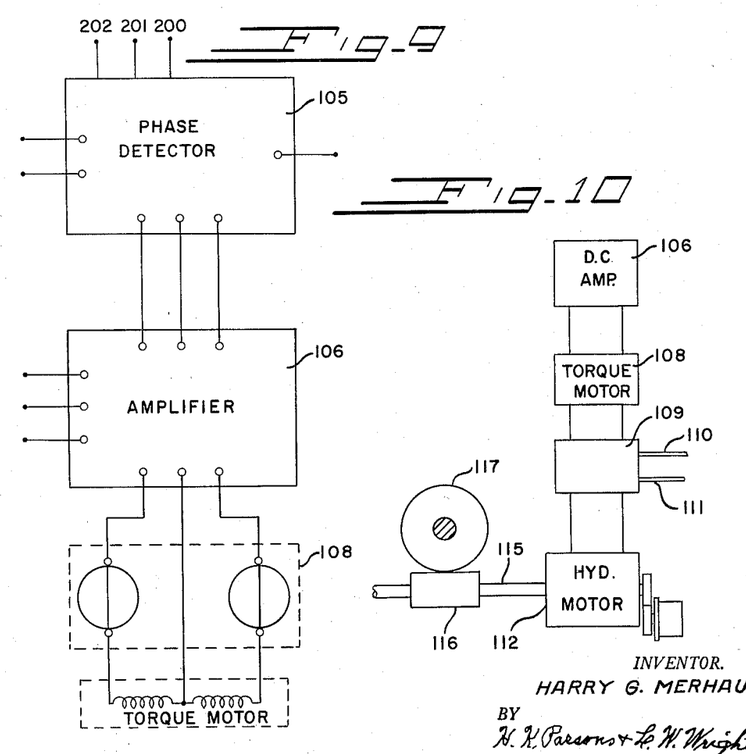
Figure 9 is a basic torque motor control diagram.
Figure 10 is a schematic diagram of the amplification and motor circuit.

It will be understood that by employment of a single master synchro unit structure, such as shown in Figure 4, that the same may be coupled with a plurality of corresponding slave units, such a coupling to two of these units having been illustrated in Figure 7. As is conventional in master-slave electric synchro control circuits, the ultimately available control current is determined as to each slave unit by coupling the synchros of the slave unit with a phase detector 105 (Fig. 8) which will emit a signal as a resultant of the several rotor positions. This signal, comprising the residual or "error" voltage, is amplified by a suitable commercial amplifier 106 and fed to the electro-hydraulic valve control unit 107. This unit includes a reversible electric torque motor 108 and torque motor controlled valve 109 reversibly controlling the flow of hydraulic medium supplied through conduits 110, 111 (Fig. 10) to the hydraulic motor 112 individual to the slave unit group to be controlled. A synchro slave unit structure located as at 44 or 270 (Fig. 2) and associate parts have been diagrammatically shown in Figure 5. As there indicated, the motor 112 through the gearing 113 operates the primary slave synchro 114 and also drives the shaft 115 having worm 116 operating worm gear 117 on shaft 118. Shaft 118 is provided with a worm 119 driving worm gear 120 on template shaft 45 and is further provided with gear 122 which through gearing 123 operates shaft 124 bearing the secondary slave synchro 125. Shaft 124 through the worm and worm wheel gearing 126 operates at a reduced rate, such as the one to 50 ratio previously referred to, the third slave synchro 127.

Additionally, and as indicated in Figure 5, shaft 121 through the reduction gearing 128 operates shaft 129 bearing the template shifter control cam or eccentric 130. By the drive connections just described it will be evident that the template cam nest 48 supported by the shaft 45 and the control cam 130 are synchronously operated but at appreciably different rates of speed, as for example, a five to one rate of rotation, the general control of movement of both being effected, however, by the operation of the common drive motor 112, as timed and controlled by the master and slave synchros.

Since the master synchro unit and the several slave synchro units are all supported by and move with the carrier slide 27 and gantry frame 28, it will be evident that the necessity for long templates, complicated electrical conduit systems or mechanical transmission devices are eliminated and that it is merely necessary to employ short conduit cables, such as 131, connecting the master synchro 70 with the individual slave synchro unit such as 270 for securing completely accurate automatic control of the functioning of the slave unit.

As have been previously referred to, control mechanism of the type here described is particularly efficient and desirable in connection with large machines, as for example, machines having a 30 foot or greater gantry carriage travel. In order that the overall measurements of templates or like control devices may be minimized, there has been indicated as employed in this connection the template cam nests such as 48, indicated in the several machine views, one such nest being semi-diagrammatically shown in Figure 6. In this particular form there have been employed five individual templates or cam elements 132—133—134—135—136. The rate of drive or rotation of the shaft 46 carrying this nest of templates is so timed with respect to the distance moved by the gantry and carriage that the cam nest will move, for example, through an arc of substantially 300 degrees, this constituting the effective portion of the face of the cam, for a six foot movement of the gantry, the effective portions of the five cams together therefore serving accurately to control the up and down and in or out or other movements of the respective machine tool movements during the entire 30 foot operative stroke of the machine.

Figure 6:
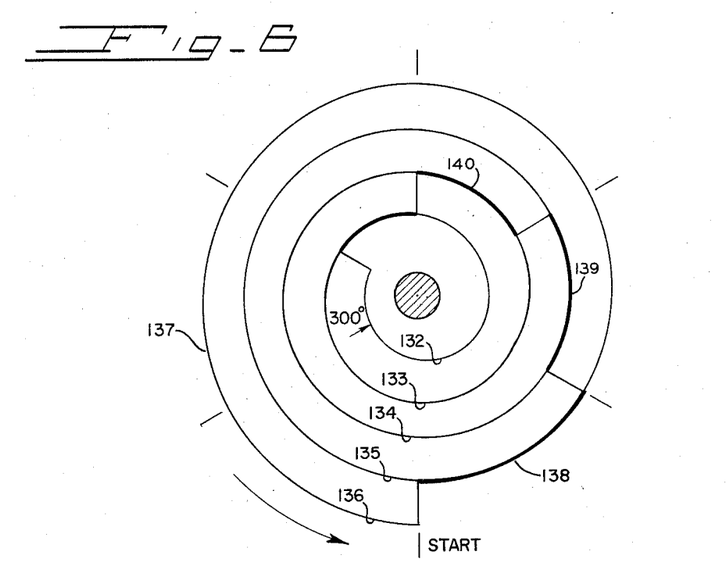
Figure 6 is a plan view of one form of cam template nest on which has been diagrammatically indicated the effective zones of the respective individual cams.

In order that this control may be continuously accurately effective, as has been particularly indicated in Figure 6, each cam has an individual contoured path portion, such as 137, extending about its periphery through an arc of 300 degrees and a transfer portion such as 138, whose contour corresponds to the initial control path of the adjacent contour template. Such corresponding transfer points have also been indicated at 139 and 140 in Figure 6. These co-incidental contour portions of the adjacent cams of an individual cam nest 48 provide a cross over path from the control periphery of one cam to that of the adjacent cam, permitting continuous operation of the machine during a cutting operation while facilitating initial construction of the cam nest as independent assembled units, any of which may be removed and replaced by a unit of different contour depending upon the particular sequence of movements desired as respects the controlled spindle head.

The maner in which this feature is utilized should be readily understood by reference to Figs. 3 and 5 of the drawings. As has been pointed out in a 30 foot cutting stroke of the machine of the character shown, it is frequently desirable that an appreciable amount of movement be imparted to the spindle carriers, mention having been made, for example, of 12" horizontal movement and 18" vertical movement of the spindle carriers as an example. Since the amount of carrier movement in the ultimate is controlled by physical movement of the tracer bar is effected by the contours of the cams their surfaces in some instances must vary in radial measurement by amounts of 15" to 18". For cooperation with the periphery of these cams, the sliding tracer bar 50 is provided with a transversely projecting stud or axle 141 overlying the periphery of the group of nested cams 48 and supporting the follower roll 49 which is of sufficient diameter freely to roll on and follow the periphery of the cams while properly conforming to their contour.

In Figure 2 of the drawings the spindle carrier cross slide 39 is shown in its outermost or retracted position and with the follower roller 49 engaging the template 136. Rotation of this template, as effected by the motor 112, will cause conventional type tracer control of the in and out movement of the cross slide in accordance with the contour of template 136 throughout its 300 degrees of rotation. As has been particularly illustrated in Figure 3, the supporting shaft 45 for the template nest 48 is splined to and axially slidable with respect to the hub of the driving worm gear 120. The inner end of the shaft is connected by a thrust bearing 142 for rotation relative to but supported against axial movement with respect to piston rod 143 on which is mounted the piston 144 slidable in cylinder 145 fixed to the frame 44. A bracket 146, secured to the projecting end of the piston rod 143, is coupled to the servo valve casing 147 having ways 148 slidably mounted on guide 149 laterally projecting from the frame 44. Contained within the casing 147 is a conventional servo or tracer valve whose position is determined by movement of the tracer finger, or follower 150, which rides against the contoured periphery of the control cam 130. Connected into the casing 147 are the hydraulic pressure input conduit 151 and the exhaust conduit 152, the contained servo valve selectively determining the coupling of these conduits with the pair of conduits 153 and 154 connected to opposite ends of the cylinder 145 for control of reaction of the hydraulic medium against piston 144. The inlet or exhaust of hydraulic medium from one end or the other of the hydraulic cylinder determines in conventional manner the position of the piston 144 and thus the axial movement of rod 143 and shaft 45.

Mention has been made of the fact that the cam 130 preferably rotates at about ⅕ the speed of rotation of the cam nest 48 and its contour is provided with a plurality of stepped contour portions, such as 155, 156, 157 indicated in Figure 3 as concentric with the axis of rotation 129 of the cam, these several concentric portions being connected by inclined steps such as 158, 159. As the cam is rotated in a counterclockwise direction as viewed in Figure 3 in synchronism with the rotation of the cam nest 48, when one of the crossover path portions, such as 138 of the cam nest, is aligned with the follower roller 49 a step portion such as 158 will move into alignment with the follower 150, allowing the follower to move inwardly from engagement with the contour portion 155 to ride on the contour portion 156 of cam 130. This movement will cause a flow of pressure into the left hand end of cylinder 145 moving piston 144 and thus shaft 45 and cam nest 48 gradually toward the right, the rate of movement depending on the angle of the step 158. As the parts so move, the follower roller 49 will, in effect, by movement of the nest be transferred diagonally over the crossover portion of the cams from an effective control position on cam 132 into alignment with cam 133. As this movement is completed, the position of tracer finger 150 will then be stabilized by the progressively moving concentric portion 156 of cam 130 while the follow-up action created by movement transmitted from 143 by way of 146 to the servo valve casing 147 will have shut off or impounded hydraulic fluid on the opposite sides of piston 144, thus locking the piston and, through the connection shown, shaft 45 and pattern nest 48 against axial movement or displacement until a new stepover path such as 159 shall be brought into operative engagement with the tracer finger 150. It will be understood that as the parts continue their rotation the successive diagonal relative shiftings of the follower roller 49 with respect to the individual control cams such as 132, 133, 134, 135, and 136 will take place, the varying diameter of the respective cams being effective for positional control of the cross slide or the other associate member as the extent of its stroke increases.

If the cam follower 49 engages the outer or remote face of the cams as indicated at the left in Figure 1 and a progressively deeper cut or advance of tool 33 toward the work is to be effected the cam nest will be so mounted that upon initiation of the operation of the machine the follower 49 will be in engagement with the periphery of the largest diameter cam member 136 so that as the cam nest is axially shifted the follower will move successively into engagement with the cam units of smaller diameter permitting the tool, such as 33, to move toward the work supporting bed 25 of the machine. A spring such as 260 (Fig. 2) may be employed to supplement or to take the place of the normal tracer valve controlling spring in holding the follower 49 against the cam unit.

On the other hand, it will be evident that if it is desired to have positive urge of the cams against the follower 49 the same may be mounted on the tracer slide bar 50 in position to engage the inner rather than the outer face of the nest of cams so that it will initially be controlled by the smallest diameter cam such as 132 and progressively advance from 132 to 136 in accordance with the demand for increased inward movements of the cutter bearing slide. It will be understood that in this event the template nest such as shown in Figure 6 will be mounted with the larger cam disc 136 facing inwardly or toward the drive unit and with the smaller cam unit 132 disposed at the outer end of the supporting shaft 46.

In Figures 2 and 3 there has been illustrated a supplemental or auxiliary utilizable mechanical drive for control to accurate indexing of cam nest such as 48. In this instance, the shaft 118, Figure 3, has been shown as provided with the bevel gear 160 driving pinion 161 on vertical shaft 162 which is formed with telescoping sections. This shaft through bevel gearing 163 transmits power to shaft 164. Shaft 164 through gearing 165 effects rotation of shaft 166 at a rate identical with the rate of rotation of shaft 45. Shaft 166, in turn, supports the cam nest 170 similar to the cam nests such as 48 and effective in the instance shown for control of vertical movement of the slide 37. In other words, the structure just described comprises a mechanical power take-off from the synchro controlled shaft 118 so that the single slave synchro mechanism controls both the vertical and transverse movements of the particular cutter head in question. It will be noted that the control elements in question are suitably supported from the frame 35 by a bracket structure 171.

It will be understood that in the use of the machine the carrier slide 27 and gantry frame 28 are suitably moved or fed along the bed 25 relative to the work by suitable conventional feed mechanism. This, for example, may comprise the motor driven shaft 172 journaled in the carriage 27 and through gearing 173 driving the pinion 174 meshing with a rack such as the rack 68 carried by the bed. During such translating movement of the carriage 27 pinion 69 meshing with the rack 68 imparts to the master synchro mechanism a rate of movement or rotation synchronous with and in direct proportion to the movement of the cutter supporting gantry mechanism.

In the foregoing described structure there has been provided a master synchro control system synchronized in operation with the feeding mechanism of the machine and electrically coupled to one or more slave synchro units, each embodying an electro hydraulic motor control unit activatable to determine the rate of rotation of a control template nest for determination of cutter slide positioning, together with means for movement of various individual slides and control mechanism for said slide moving means connected to and intervening the means and the slave synchro operated control templates for effecting extremely minute accurate movements of the slides.

Additionally, in the present invention there has been provided an improved structure embodying supplemental intergeared master synchro units and coupled intergeared slave synchros which are operable at reduced rates to prevent out of phase displacement of the primary master and slave synchros which are effective to insure exact positional correspondence within extremely fine measurements as respects the slide movement effected master synchro adjustment and the adjustment of the slave synchro controlled template mechanisms.

As has been emphasized, the present invention results in maximum simplification of control throughout the entire stroke of very large machines in that expensive longitudinal templates and complex or complicated mechanical or like control cables and transmissions are eliminated, simple electric conduits carried by the basic moving element and extending to the several translatable elements being the only connections normally required. However, by employment of the present basically novel improved control mechanism, particularly in the case of closely related parts, an auxiliary mechanical drive operated by this control mechanism, as hereinabove described, may be utilized for positive accurate control of additional shift controlling elements such as pattern nests and associated slide positioning mechanisms.

In the operation of the machine controlled cutting may be performed in either one or both directions dependent on the desired use and the particular contours of the control cam structures, conventional cross indexing and like mechanisms being employable for manual cutter adjustments and positionings. In the form illustrated, the nature and contour of the various control cams, such as 130 and 132 to 136, are such as to be effective during either direction of movement of the carriage 27 and gantry for cutting in either direction or for proper retraction of the cutters when moved back over a previously machined surface without the necessity of utilization of special additional retraction mechanism.

What is claimed is:

1. In a machine for formation of contoured work surfaces, a bed, a tool support translatable on the bed, a tool carrying slide adjustably mounted on the support, a first master synchro mounted on the tool support and movable therewith relative to the bed, means for driving the first master synchro at a rate proportional to the rate of translation of the support relative to the bed, said means including a rack mounted on the bed, and a pinion coupled to the master synchro and meshing with the rack for actuation thereby upon movement of the synchro relative to the bed, a first gear train driven by the pinion for operating the first master synchro at a selected rate, an additional speed reducing gear train driven by the pinion and a second master synchro connected to said reducing gear train for operation thereby at a slower rate than said selected rate, a slave synchro unit carried by the tool support, said unit including a primary slave synchro operable at a selected speed and a coupled secondary slave synchro simultaneously operable at a relatively slower speed, gearing interconnecting said slave servos establishing their relative rates of speed, electrical conductors connecting respectively the master synchro and primary slave synchro and the second master synchro and secondary slave synchro for actuation of the slave synchros by the master synchros, means for shifting the tool carrying slide relative to the support, and control mechanism for said slide shifting means connected to said slave synchro unit for actuation thereby and operatively associated with said shifting means for determining the operation thereof.

2. In a machine for formation of contoured work surfaces, a bed, a tool support translatable on the bed, a tool carrying slide adjustably mounted on the support, a first master synchro mounted on the tool support and movable therewith relative to the bed, means for driving the master synchro at a rate proportional to the rate of translation of the support relative to the bed, said means including a rack mounted on the bed, and a pinion coupled to the master synchro and meshing with the rack for actuation thereby upon movement of the synchro relative to the bed, a first gear train driven by the pinion for operating the master synchro at a selected rate, an additional speed reducing gear train driven by the pinion, a second master synchro connected to said reducing gear train for operation thereby at a slower rate than said selected rate, a slave synchro unit carried by the tool support, said unit including a primary slave synchro operable at a selected speed and a coupled secondary slave synchro simultaneously operable at a relatively slower speed, gearing interconnecting said slave servos establishing their relative rates of speed, electrical conductors connecting respectively the master synchro and primary slave synchro and the second master synchro and secondary slave synchro for actuation of the slave synchros by the master synchros, means for shifting the tool carrying slide relative to the support, control mechanism for said slide shifting means connected to said slave synchro for actuation thereby and operatively associated with said shifting means for determining the operation thereof, a slave synchro unit carried by the tool support, said control mechanism including a phase detector coupled with the slave servos and energizable thereby, an amplifier for the output of the detector, a motor connected to the slave servos for rotation thereof, and a motor control unit coupled with the amplifier and activatable by the output of the amplifier for determining the power reaction of the motor as respects the slave synchros.

3. In a machine for formation of contoured work surfaces, a bed, a tool support translatable on the bed, a tool carrying slide adjustably mounted on the support, a master synchro mounted on the tool support and movable therewith relative to the bed, means for driving the master synchro at a rate proportional to the rate of translation of the support relative to the bed, said means including a rack mounted on the bed, and a pinion coupled to the master synchro and meshing with the rack for actuation thereby upon movement of the synchro relative to the bed, a first gear train driven by the pinion for operating the master synchro at a selected rate, an additional speed reducing gear train driven by the pinion and a second master synchro connected to said reducing gear train for operation thereby at a slower rate than said selected rate, a slave synchro unit carried by the tool support, said unit including a primary slave synchro operable at a selected speed and a coupled secondary slave synchro simultaneously operable at a relatively slower speed, gearing interconnecting said slave servos establishing their relative rate of speed and electrical conductors connecting respectively the master synchro and primary slave synchro, and the second master synchro and secondary slave synchro for actuation of the slave synchros by the master synchros, means for shifting the tool carrying slide relative to the support, control mechanism for said slide shifting means connected to said slave synchro for actuation thereby and operatively associated with said shifting means for determining the operation thereof, said control system including a rotatably mounted nested series of cam discs having contoured peripheries, driving connections between the slave synchro and said series of discs for rotating the discs, said slide shifting means including a hydraulic motor, and a servo control for said motor having a follower selectively engageable with the contoured peripheries of the discs and positionable thereby.

4. In a machine for formation of contoured work surfaces, a bed, a tool support translatable on the bed, a tool carrying slide adjustably mounted on the support, a master synchro mounted on the tool support and movable therewith relative to the bed, means for driving the master synchro at a rate proportional to the rate of translation of the support relative to the bed, said means including a rack mounted on the bed, and a pinion coupled to the master synchro and meshing with the rack for actuation thereby upon movement of the synchro relative to the bed, a first gear train driven by the pinion for operating the master synchro at a selected rate, an additional speed reducing gear train driven by the pinion and a second master synchro connected to said reducing gear train for operation thereby at a slower rate than said selected rate, a slave synchro unit carried by the tool support, said unit including a primary slave synchro operable at a selected speed and a coupled secondary slave synchro simultaneously operable at a relatively slower speed, gearing interconnecting said slave, servos establishing their relative rate of speed and electrical conductors connecting respectively the master synchro and primary slave synchro, and the second master synchro and secondary slave synchro for actuation of the slave synchros by the master synchros, means for shifting the tool carrying slide relative to the support, control mechanism for said slide shifting means connected to said slave synchro for actuation thereby and operatively associated with said shifting means for determining the operation thereof, said control system including a rotatably mounted nested series of cam discs having contoured peripheries, driving connections between the slave synchro and said series of discs for rotating the discs, said slide shifting means including a hydraulic motor, and a servo control for said motor having a follower selectively engageable with the contoured peripheries of the discs and positionable thereby, indexing means for effecting axial indexing movement of the nested series with respect to said follower, and driving connections between the slave synchro and the indexing means for effecting said indexing movement in timed relation to the synchro effected rotation of the discs.

5. In a machine for formation of contoured work surfaces, a bed, a tool support translatable on the bed, a tool carrying slide adjustably mounted on the support, a master synchro mounted on the tool support and movable therewith relative to the bed, means for driving the master synchro at a rate proportional to the rate of translation of the support relative to the bed, said means including a rack mounted on the bed, and a pinion coupled to the master synchro and meshing with the rack for actuation thereby upon movement of the synchro relative to the bed, a first gear train driven by the pinion for operating the master synchro at a selected rate, an additional speed reducing gear train driven by the pinion and a second master synchro connected to said reducing gear train for operation thereby at a slower rate than said selected rate, a slave synchro unit carried by the tool support, said unit including a primary slave synchro operable at a selected speed and a coupled secondary slave synchro simultaneously operable at a relatively slower speed, gearing interconnecting said slave servos establishing their relative rate of speed and electrical conductors connecting respectively the master synchro and primary slave synchro, and the second master synchro and secondary slave synchro for actuation of the slave synchros by the master synchros, means for shifting the tool carrying slide relative to the support, control mechanism for said slide shifting means connected to said slave synchro for actuation thereby and operatively associated with said shifting means for determining the operation thereof, said control system including a rotatably mounted nested series of cam discs having contoured peripheries, driving connections between the slave synchro and said series of discs for rotating the discs, said slide shifting means including a hydraulic motor, and a servo control for said motor having a follower selectively engageable with the contoured peripheries of the discs and positionable thereby, indexing means for effecting axial indexing movement of the nested series with respect to said follower, and driving connections between the slave synchro and the indexing means for effecting said indexing movement in timed relation to the synchro effected rotation of the discs, each of said discs having an independent slide controlling peripheral portion, and adjacent discs of the series having coinciding correspondingly contoured portions jointly providing a peripherally extending control contour path for follower position control during said indexing movement.

6. In a machine for formation of contoured work surfaces, a bed, a tool support translatable on the bed, a tool carrying slide adjustably mounted on the support, a master synchro mounted on the tool support and movable therewith relative to the bed, means for driving the master synchro at a rate proportional to the rate of translation of the support relative to the bed, said means including a rack mounted on the bed, and a pinion coupled to the master synchro and meshing with the rack for actuation thereby upon movement of the synchro relative to the bed, a first gear train driven by the pinion for operating the master synchro at a selected rate, an additional speed reducing gear train driven by the pinion and a second master synchro connected to said reducing gear train for operation thereby at a slower rate than said selected rate, a slave synchro unit carried by the tool support, said unit including a primary slave synchro operable at a selected speed and a coupled secondary slave synchro simultaneously operable at a relatively slower speed, gearing interconnecting said slave servos establishing their relative rate of speed and electrical conductors connecting respectively the master synchro and primary slave synchro, and the second master synchro and secondary slave synchro for actuation of the slave synchros by the master synchros, means for shifting the tool carrying slide relative to the support, control mechanism for said slide shifting means connected to said slave synchro for actuation thereby and operatively associated with said shifting means for determining the operation thereof, said control system including a rotatably mounted nested series of cam discs having contoured peripheries, driving connections between the slave synchro and said series of discs for rotating the discs, said slide shifting means including a hydraulic motor, and a servo control for said motor having a follower selectively engageable with the contoured peripheries of the discs and positionable thereby, indexing means for effecting axial indexing movement of the nested series with respect to said follower, and driving connections between the slave synchro and the indexing means for effecting said indexing movement in timed relation to the synchro effected rotation of the discs, each of said discs having an independent slide controlling peripheral portion, and adjacent discs of the series having coinciding correspondingly contoured portions jointly providing a peripherally extending control contour path for follower position control during said indexing movement, said indexing means including a hydraulic indexing motor coupled with the nested series of discs for axially moving same, a servo control for said indexing motor, said control including a follower, and a control cam in the driving connections from the slave synchro having a plurality of circumferentially extending segmental arcuate portions of different radii for sequential engagement with the follower, said arcuate portions being connected by blending contours facilitating gradual transition of the follower from one to another of said arcuate portions.

7. In a machine for formation of contoured work surfaces, a bed, a tool support translatable on the bed, a first slide translatable on the support, a tool carrying slide adjustably mounted on said first slide, a master synchro mounted on the tool support and movable therewith relative to the bed, means for driving the master synchro at a rate proportional to the rate of translation of the support relative to the bed, a slave synchro carried by one of the slides, means electrically coupling the master and slave synchros, means for shifting the first slide relative to the support, means for shifting the tool slide relative to said first slide, and control mechanism for said shifting means connected to said slave synchro for actuation thereby and operatively associated with said shifting means for determining the operation thereof, said mechanism including a power motor whose operation is controlled by the slave synchro, a first control cam shaft for the first slide, a second control cam shaft for the tool carrying slide, and transmission means connecting said shafts with the power motor for synchronous actuation thereby in accordance with the signal dictates transmitted from the master to the slave synchro by said electric coupling means.

8. In a machine for formation of contoured work surfaces, a bed, a tool support translatable on the bed, a first slide translatable on the support, a tool carrying slide adjustably mounted on said first slide, a master synchro mounted on the tool support and movable therewith relative to the bed, means for driving the master synchro at a rate proportional to the rate of translation of the support relative to the bed, a slave synchro carried by one of the slides, means electrically coupling the master and slave synchros, means for shifting the first slide relative to the support, means for shifting the tool slide relative to said first slide, and control mechanism for said shifting means connected to said slave synchro for actuation thereby and operatively associated with said shifting means for determining the operation thereof, said mechanism including a power motor whose operation is controlled by the slave synchro, a first control cam shaft for the first slide, a second control cam shaft for the tool carrying slide, and transmission means connecting said shafts with the power motor for synchronous actuation thereby in accordance with the signal dictates transmitted from the master to the slave synchro by said electric coupling means, said transmission means including a telescoping shaft intervening the power motor and one of the control shafts to permit relative positional adjustment of the motor and said shaft without interruption of the drive of the shaft by the motor.

References Cited in the file of this patent

UNITED STATES PATENTS

| 2,560,337 | Fouassin | July 10, 1951 |
| 2,675,743 | Martellotti et al. | Apr. 20, 1954 |
| 2,753,244 | Dubosclard | July 3, 1956 |